April 16, 1968     D. L. BIESECKER     3,378,219
PLASTIC FASTENER
Filed Jan. 13, 1967
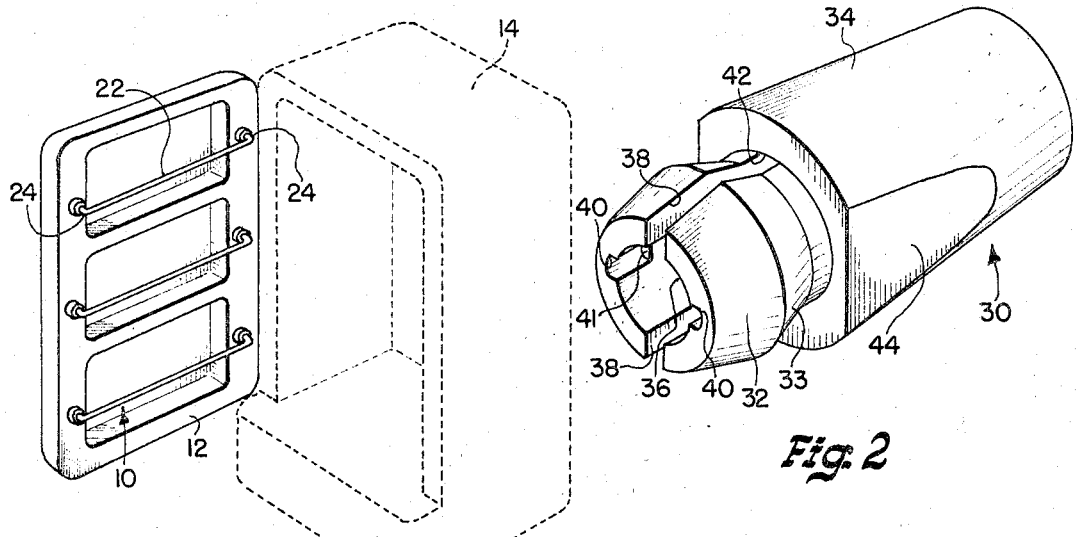
Fig. 1
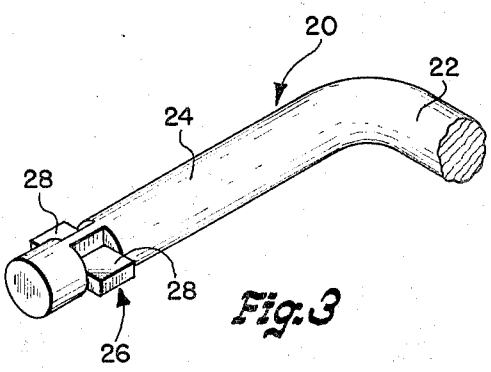
Fig. 2
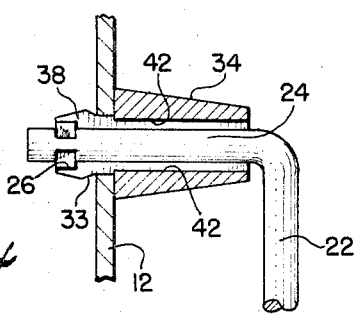
Fig. 4
Fig. 3
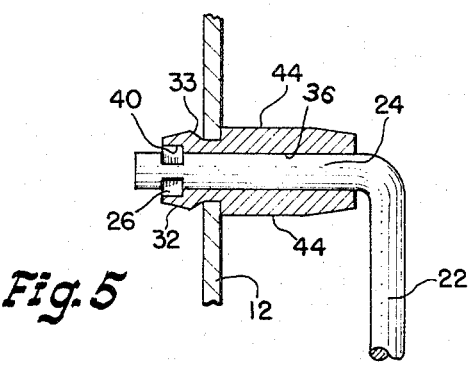
Fig. 5
INVENTOR.
Donald L. Biesecker
BY
His Att'ys United States Patent Office 3,378,219
Patented Apr. 16, 1968

3,378,219
PLASTIC FASTENER
Donald L. Biesecker, Dayton, Ohio, assignor to Illinois Tool Works Inc., Chicago, Ill., a corporation of Delaware
Filed Jan. 13, 1967, Ser. No. 609,034
5 Claims. (Cl. 248—220.5)

ABSTRACT OF THE DISCLOSURE

A one-piece plastic fastener having a bifurcated shank with internal recesses for mounting a rod, having protuberance means at its extremity, in perpendicular relation to an apertured panel, with the protuberance means expanding the shank and being captured in the recesses of the shank to prevent axial movement of the rod relative to the panel.

---

The present invention relates to an improved fastener for mounting a rod member in an apertured panel. More particularly, the fastener is preferably a one-piece molded plastic device which is ideally adapted for use in mounting a bottle guard rod in the inner door liner of a refrigerator. The fastener is adapted to be attached from the front side of the liner whereas, the previous fasteners used for this purpose required an operation on both the front and back sides of the liner. The fastener of the present invention quarter-turns to expand prong means back of the liner with protuberance means on the rod being locked in place within the fastener after the quarter turn so that the rod means cannot be axially moved relative to the liner.

A preferred form of the invention will now be described with reference to the drawings in which:

FIG. 1 is a perspective view showing a refrigerator door inner liner utilizing the present invention with the door attached to a refrigerator shown in phantom;

FIG. 2 is a perspective view of a fastener of the type contemplated by the present invention;

FIG. 3 is a perspective view of a rod member of the type contemplated to be used with the fastener shown in FIG. 2;

FIG. 4 is an elevation in partial section showing the fastener in FIG. 2 and the rod means of FIG. 3 in its initial position when mounted in an apertured work panel; and FIG. 5 is an elevational view in partial section showing the device of FIG. 4 after the fastener has been rotated to lock the rod means relative to the panel.

Referring now to the drawings wherein similar numerals are utilized to identify similar parts, an assembly generally designated by the numeral 10 of a rod member 20 and a fastener means 30 is shown mounted in the inner door liner 12 of a refrigerator 14. In the illustrated embodiment, the rod member serves as a bottle guard rod having an elongated central portion 22 and a pair of end portions 24 perpendicular to the central portion. At the extremity of the end portions 24 there are provided laterally extending protuberance means 26. As can be seen in FIG. 3, the protuberance means may take the form of a pair of ears or lugs 28 swaged from the material of rod 20. While the present embodiment shows rod 20 as being of metallic material with the protuberance means 26 being forged from the parent metal, it should be recognized by those skilled in the art that rod 20 could be of plastic material with the protuberance means either mechanically formed or formed during the molding of the rod member.

The fastener means, generally designated by the numeral 30, includes a shank 32 and a head 34 with a bore 36 passing through both the shank and the head portions and communicating with opposite extremities of the fastener. The shank in the preferred embodiment has a tapered nose portion and an intermediate shoulder 33 with the entire shank being bifurcated by a pair of slots 38. Recess means 40 are provided in the inner wall of the shank communicating with the bore 36 and are positioned opposite one another in quadrature relative to the bifurcation slot 38, for purposes best set forth hereinafter. Groove means 42 are provided in the head communicating with the bore 36 and radially aligned with the slots 38. The grooves 42 in the preferred embodiment extend through the entire head section for purposes best set forth hereinafter. In the illustrative embodiment the head 34 is generally frusto-conical in configuration and has at least two flats 44 to provide wrenching means on the exterior of the head to permit rotation of the fastener.

A fastener of this type is preferably injection molded of a plastic material such as nylon or delrin which will provide resiliency to the shank portion as well as rigidity to the head portion.

As can be best seen in FIG. 4, the fastener 30 is axially telescoped onto the rod 20 with the ears 28 of protuberance means 26 passing through head 34 in alignment with the groove means 42 until the protuberance means 26 are axially located within the slots 38 of the shank 32. The preassembly is then axially telescoped as a unit through an aperture in the panel 12. When the head 34 is seated against one surface of panel 12 it is rotated 90° by means of the wrenching flats 44 until such time that the ears 28 are seated in locked position within the recess means 40. This expands the bifurcated shank portions in a radial direction so as to cause the shoulder means 33 to more aggressively underlie the panel as well as to prevent the axial withdrawal of the rod relative to the panel since it is captured within the recess means 40. The recess means 40 is open at the extremity of the shank but provides shoulders or abutments 41 at the end of the recess closest to the head which cooperate with the ears 28 to prevent axial movement of the rod away from the panel. Thus, it should be seen that an inexpensive means of attaching a rod-like member relative to a panel, solely from the front side of the panel, is provided by the present invention. While the single embodiment disclosed relates to the use of the invention for maintaining a bottle guard rod in mounted position in the inner door liner of a refrigerator, it will be apparent that other purposes or applications of this technique for mounting a rod perpendicularly to a panel will be apparent to those skilled in the art. The device is economical in cost, provides a neat appearance on the visible side of a panel and because of its simplicity in installation would provide economies in labor assembly costs.

While other modifications, in part, will be apparent to those skilled in the art, it is my intent that I be limited only by the appended claims.

What is claimed is:

1. A shelf guard assembly for refrigerator door liners including in combination an apertured door liner, at least one bottle guard rod being generally U-shaped in configuration and formed of rod-like material, said guard having an elongated central portion and a pair of short end portions perpendicular to said center portion, said end portions each having protuberance means adjacent their extremities extending in opposite directions and lying in a plane located on the axis of said end portions, fastener means adapted to mount said end portions in an appropriate aperture in said door liner, said fastener means including a shank and a laterally extending head at one extremity of said shank, said shank and head having a through-bore communicating with opposite extremities of the fastener, said shank being bifurcated to present a pair of movable sections with the slots separating said sections falling in a plane lying on the axis of the fastener and communciating with said bore, axially extending recess means positioned on the interior of each of said shank sections in opposition to the recess means on the opposite shank section, means on said head to facilitate rotation of the fastener, groove means within said head communicating with said bore and axially aligned with the slots in said bifurcated shank whereby each end portion of said bottle guard is axially telescoped within a fastener and the preassembled fastener and rod then telescoped within the door liner aperture, said fastener being adapted to be rotated whereby said protuberance means on the end portions of said rod will spread said shank sections and be retained in locked position when the protuberance means are seated in the groove means within said shank.

2. In combination, a one piece molded plastic fastener and a rod member adapted to be mounted in an apertured panel, said rod member being provided adjacent one extremity with laterally extending protuberance means, said fastener including a bifurcated shank and a laterally extending head, said shank and head having a through-bore communicating with opposite extremities of the fastener, axially extending groove means within said shank communicating with said bore and terminating short of said head, means on said head to facilitate rotation of said fastener, said rod being telescopically associated with the bore of said fastener and initially having its lateral protuberance means positioned between sections of the bifurcated shank so as to permit insertion of the fastener and rod into the aperture of the panel with which it is to be associated, rotation of said fastener causing said protuberance means to laterally expand the bifurcated shank and to seat said protuberance means in locked position in said groove means.

3. A device of the type claimed in claim 2 wherein said head is provided with axially extending groove means communicating with said bore and axially aligned with the interdental spacing between the bifurcated shank portions, said groove means being adapted to accept the protuberance means on said rod for the telescope association of the rod and fastener.

4. A device of the type claimed in claim 2 wherein said head is conical in shape and is provided with wrenching flats positioned on opposite sides of said head to facilitate its rotation.

5. A device of the type claimed in claim 2 wherein said bifurcated shank is provided with shoulder means intermediate its extremities to facilitate snap engagement of said fastener with the apertured panel with which it is to be associated prior to rotation of the fastener, said shank being generally circular in transverse section.

References Cited

UNITED STATES PATENTS

| | | | |
|---|---|---|---|
| 2,239,798 | 4/1941 | Tinnerman | 248—239 XR |
| 2,490,854 | 12/1949 | Bozoti | 248—225 |
| 2,657,894 | 11/1953 | Sklenar | 248—239 |
| 3,078,064 | 2/1963 | Turnbull | 248—239 |

JOHN PETO, *Primary Examiner.*